Figure 6:
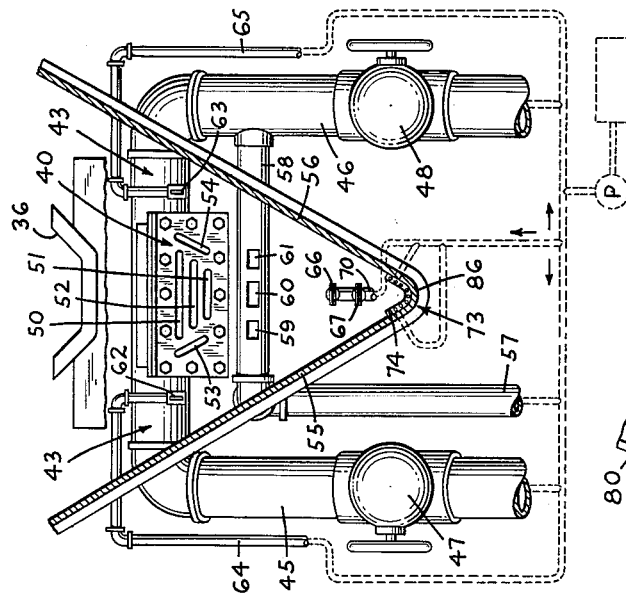

March 6, 1962 C. R. KUZELL ETAL 3,023,454
HYDRAULIC QUENCHING AND GRANULATION OF MOLTEN MATERIALS
Filed March 8, 1960 3 Sheets-Sheet 1
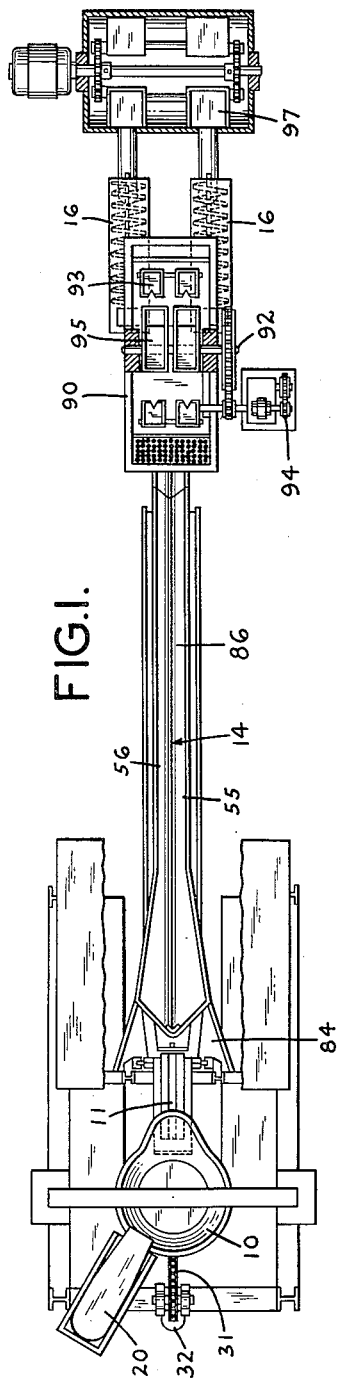
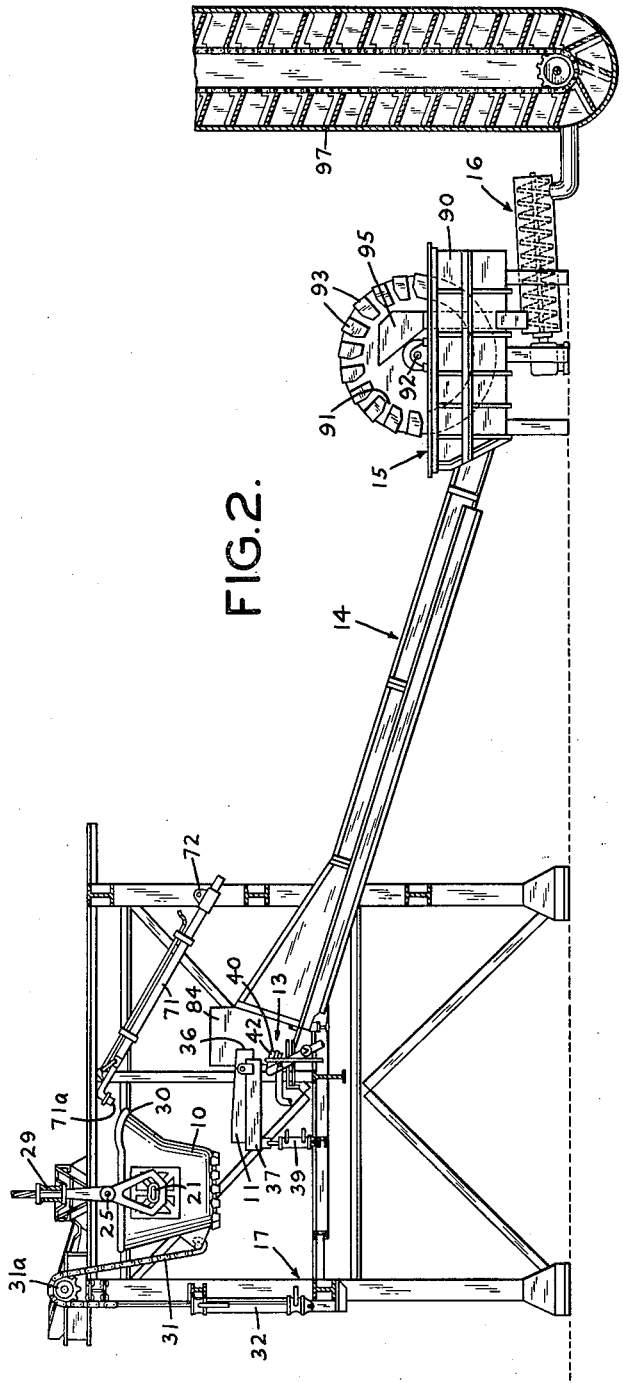

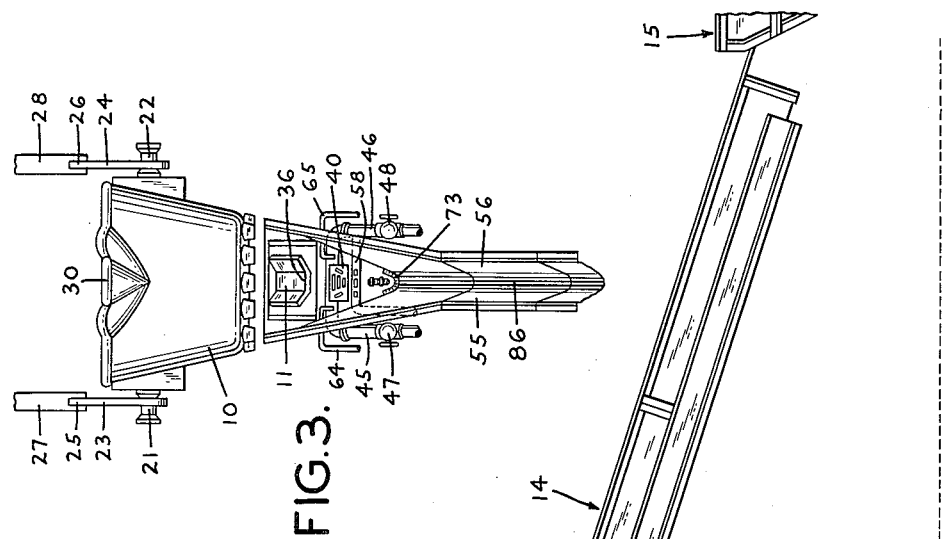
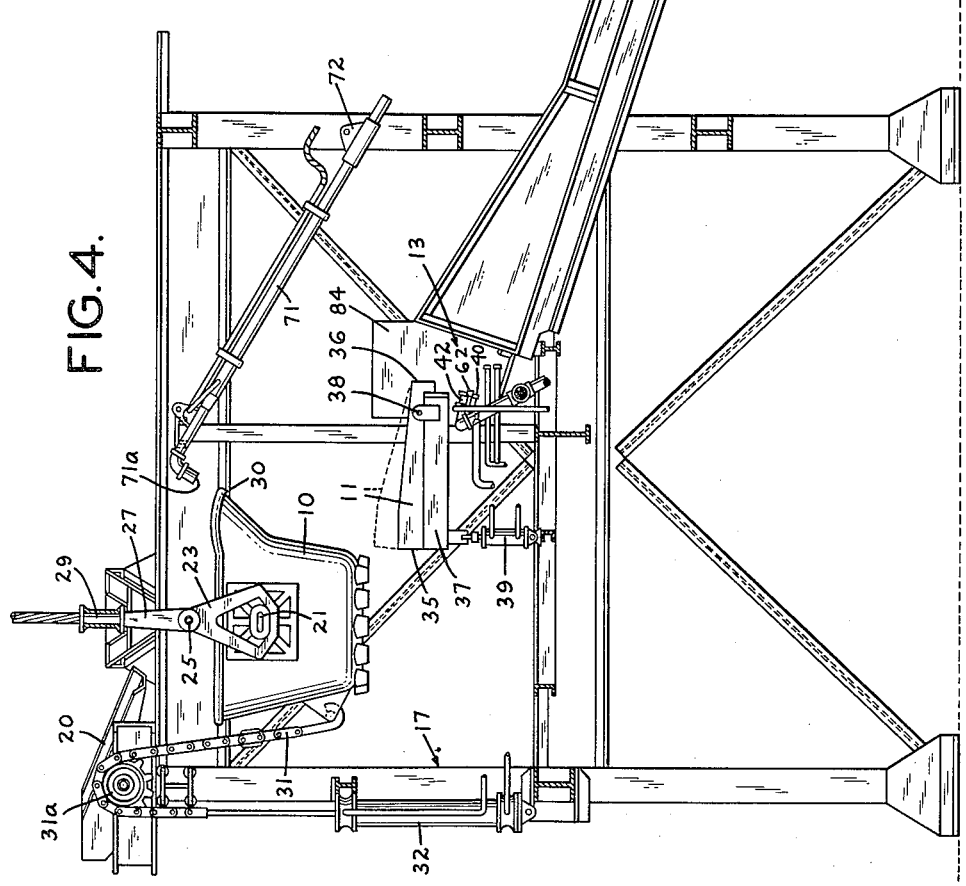

March 6, 1962 C. R. KUZELL ETAL 3,023,454
HYDRAULIC QUENCHING AND GRANULATION OF MOLTEN MATERIALS
Filed March 8, 1960 3 Sheets-Sheet 3

United States Patent Office 3,023,454
Patented Mar. 6, 1962

3,023,454
HYDRAULIC QUENCHING AND GRANULATION OF MOLTEN MATERIALS
Charles R. Kuzell, Phoenix, Morris G. Fowler and John H. Davis, Jr., Douglas, Leonard Klein, Scottsdale, William J. Uren, Douglas, and Irvine Macdougall, Warren, Ariz., assignors to Phelps Dodge Corporation, New York, N.Y., a corporation of New York
Filed Mar. 8, 1960, Ser. No. 13,589
11 Claims. (Cl. 18—2.5)

This invention relates to hydraulic quenching and granulation of molten magmas, metallic compositions, and the like.

In certain processes of treating copper matte in a copper converter for the production of blister copper there is produced a molten magma containing predominant amounts of iron oxides. Such a process is disclosed in the pending application of Kuzell et al., Serial No. 13,593, filed March 8, 1960. In that application there is disclosed a process of treating copper matte in a copper converter at a temperature in the vicinity of 2400° F. without the addition of a siliceous flux whereby a molten magma is produced which is predominantly iron oxide; this magma or product being called Ferramag. The Ferramag, by reason of its high content of iron oxide and comparatively small amount of iron in the form of silicate, provides a source of iron or "raw material" for the production of sponge iron. In order to render this "raw material" amenable to reduction to sponge iron, it is necessary to comminute the Ferramag into particles of a size which are suitable for treatment with reducing agent for the reduction of the iron oxide material to sponge iron form.

This invention provides a method and apparatus for the hydraulic quenching and granulation of molten Ferramag to produce solid particles of sizes which are amenable to treatment with reducing agent to produce sponge iron. And although the invention for purposes of illustration will be described in connection with the quenching and granulation of molten Ferramag, it will be understood that it is applicable to the hydraulic quenching and granulation of many other molten materials where it is desired to change the material from molten state to closely controlled small particle sizes in solid form.

The sponge iron which is referred to herein may be considered to be in the form of porous, sponge-like solid particles of metallic iron which are pseudomorphs which, generally speaking, have retained the sizes and shapes of the solid particles of iron oxide from which they have been reduced pyrometallurgically to the solid but spongy metal without having passed through an intervening liquid phase. One method and apparatus which is suitable for the reduction of the granulated Ferramag to sponge iron is disclosed in the pending Kuzell et al. application for patent, Serial No. 13,592, filed March 8, 1960.

In accordance with one manner of practicing our invention molten Ferramag which has been skimmed from a copper converter at a temperature of about 2400° F. is poured in a controlled comparatively small stream so that it flows by gravity in the form of a free-falling continuously flowing sheet-like stream of molten magma. While the continuously flowing sheet-like stream is freely falling it is subjected to the continuous impact of a multiplicity of jet streams of water directed to exert forces on the falling molten material in directions across the vertical path through which the molten material is freely falling and it is also subjected to additional sprays of water, thereby to cause an almost instantaneous breaking up of the molten mass into small particle sized globules which are meantime so quickly cooled that the individual globules or particles are prevented from agglomeration and are trajected into the mouth of an inclined launder along with the water. The jets and streams of water are directed with sufficient force and the amount of water is sufficient to freeze and quench the globules to granules and to carry the granulated particles submerged in a flowing stream of water for sufficient time to cool the granulated particles substantially to atmospheric temperature after which the granulated iron oxide material is separated from the water.

Figure 8:
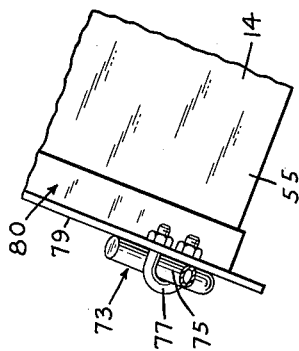
Figure 5:
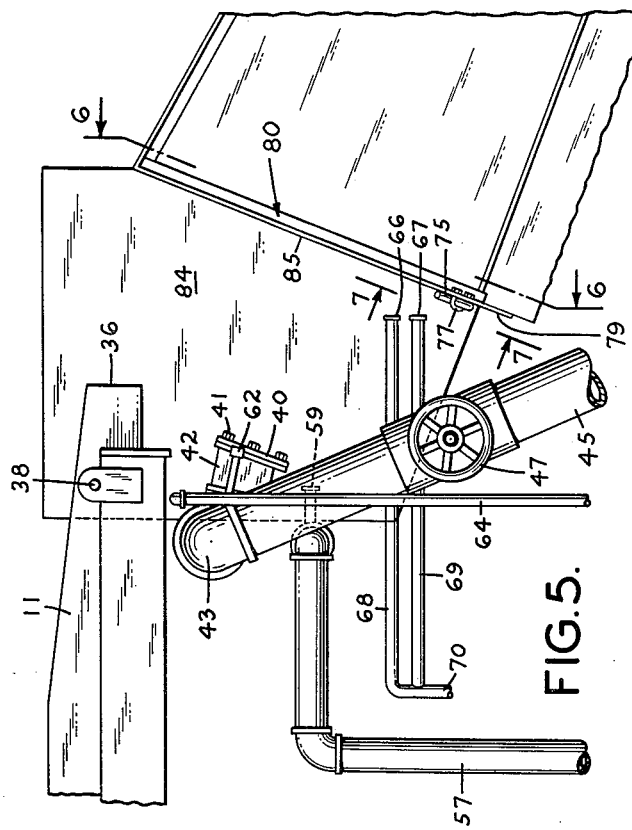
Figure 7:
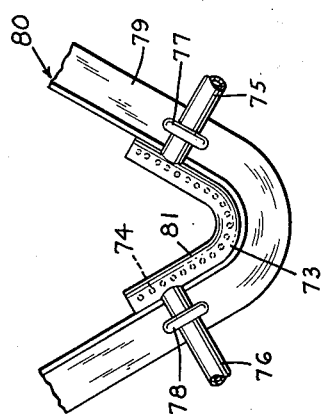

Although the novel features which are believed to be characteristic of the invention are pointed out in the annexed claims, the invention itself as to its objects and advantages and the manner in which it may be carried out may be better understood by reference to the following description taken in connection with the accompanying drawings forming a part hereof, in which FIG. 1 is a top plan view of the granulation apparatus;
FIG. 2 is a side view in elevation of the granulation apparatus;
FIG. 3 is a front view of a portion of apparatus, this view being taken from a position looking toward the front or pouring spout end of the pouring ladle;
FIG. 4 is a partial side view in elevation of the apparatus, this figure being on a larger scale than FIGURE 1;
FIG. 5 is a side view of a portion of the apparatus showing in larger scale the water jet arrangement;
FIG. 6 is a view on line 6—6 of FIG. 5;
FIG. 7 is a view on line 7—7 of FIG. 5; and
FIG. 8 is a side view of the portion of the apparatus shown in FIG. 7.

Referring now to the drawings in which like reference characters indicate like parts throughout the several views, the apparatus, in general, comprises a holding and pouring ladle 10 in which is charged a batch of molten Ferramag to be granulated; and adjustable, tiltable spoon 11 into which molten charge is poured from ladle 10 and from which a controlled, regulated sheet-like stream of molten charge may be poured; a water jet and spray arrangement 13 contrived to eject streams or jets and sprays of water into the falling stream of molten charge to break up the molten Ferramag into small globules and rapidly chill them; an inclined launder 14 of generally V-shape in cross section into which the water is directed; the water carrying with it the granulated Ferramag down the inclined launder 14 to a separator 15 in which the granules of Ferramag are separated from the water and delivered into a conveyor 16 to be transported to any desirable place for subsequent use or treatment. The apparatus is mounted and supported on a suitable supporting structural steel framework, designated generally by reference character 17.

Molten Ferramag which may be skimmed from the copper converters at a temperature in the neighborhood of 2400° F. may be charged into the pouring ladle 10 by transporting a batch of the molten Ferramag in a suitable ladle or container by means of an overhead crane (not shown) and pouring it into a charging launder 20 suitably supported on the structural steel framework 17 and leading into the ladle 10.

The holding and pouring ladle has oppositely disposed trunnions 21, 22 resting in bearing links 23, 24, pivoted at 25, 26 to suspension links 27, 28 which are supported on a fabricated cross beam 29, in turn supported by the structural steel framework 17. Hence, the pouring ladle 10 may be tilted about the trunnion pivots 21, 22 to regulate the pouring of the molten Ferramag from its pouring spout 30 into the pouring spoon 11. A sprocket chain 31, having one end secured to a bracket on the ladle 10 at the back near its bottom is trained over a suitably mounted, rotatable sprocket wheel 31a. The other end of the chain is secured to the piston rod of an hydraulic cylinder 32 mounted on the framework 17. This arrangement provides power-operated means for tilting the ladle 10 to regulate the flow therefrom of molten Ferramag charge into the pouring spoon 11.

The pouring spoon 11 is a trough closed at its rear end 35; the opposite or pouring end being open to provide a suitable pouring lip 36. The pouring spoon, carried on a base member 37, is lined with suitable refractory material and is pivotally mounted at 38. The rear end of the base member 37 may be raised and lowered by means of an hydraulic cylinder 39, the piston rod of which is pivotally secured to the base member. The hydraulic cylinder 39 is suitably mounted on the framework 17. Consequently, the spoon 11 may be raised and lowered about pivots 38 to provide delicate and precise regulation of the flow of molten charge from the lip end 36 of the spoon.

Mounted on the framework 17 beneath the pouring spoon 11 are the water jet and spray devices, designated generally by reference character 13. These comprise a system of orifices and sprays so that the water ejected will have the desired action of causing the free falling sheet-like stream of molten Ferramag to be broken up or comminuted into small separated globules of desired size, of cooling the globules almost instantaneously to a temperature which insures solidification without agglomeration, and then of providing sufficient volume of water flowing at sufficient velocity to carry the comminuted granules down the inclined launder or chute 14 to separator 15 while cooling the granulated product down to substantially atmospheric temperature or at least sufficiently low for convenient subsequent handling, and for protecting the upper end of the launder from hot molten material which might pass through the water streams. The device for the main jets comprises an orifice plate 40 tightly secured by means of cap screws 41 over the face end of a water box 42 welded to a horizontally disposed steel pipe 43 which, as shown, is 6" pipe. Opposed ends of pipe section 43 are connected to pipes 45 and 46 which are connected with a suitable source of water under pressure (not shown). Pump means P shown conventionally in FIG. 6, or other suitable means, connected by pipes to the various jets and sprays may be utilized to obtain the desired water pressure. Open and closeable valves 47, 48 are provided in pipes 45, 46. The orifice plate 40, as shown, is rectangular in shape 13½" long and 7⅝" high. It has therein near its top edge an upper horizontal orifice slot 50 which, as shown, is 8" x ¾" in size; a lower horizontal orifice slot 51 which is 4" x ½" in size; a horizontal intermediate orifice slot 52, which is 6" x ¾" in size, and opposite angularly disposed orifice slots 53, 54 which are 3½" x ½" in size, these latter mentioned orifice slots lying substantially parallel with the side walls 55, 56 of the launder. The orifices in plate 40 are sometimes herein referred to as primary jets. It should be noted that main or primary jet orifice plate 40 lies in a plane substantially at right angles to the long axis of the launder 14. A smaller pipe 57, having a horizontally disposed section 58, is also connected to a source of water under pressure. Mounted in the horizontal section 58 are three high velocity flat line spray nozzles 59, 60, 61 (herein for convenience called secondary jets), which will eject streams of water into the falling charge in a horizontal flat spray pattern. As shown, these nozzles have orifices of a size 9/16". At each side of the orifice plate 40 is mounted a flat line spray nozzle 62, 63 but mounted to eject a water stream in a flat but vertical spray pattern. These nozzles are connected to smaller pipes 64, 65, which in turn are connected to a source of water under pressure. Mounted below the header section 58 and secondary jets 59, 60, 61 is a pair of nozzles 66, 67 similar to spray nozzles 62, 63, and connected to water pipes 68, 69 in turn connected to water pipe 70, also connected to a source of water under pressure. Nozzles 66, 67 spray a horizontal flat pattern. A V-type nozzle 73 is positioned at the head of the launder 14 and at the bottom of the V-shaped launder trough. It comprises a V-shaped pipe section 81 closed at both ends and having spray apertures 74 facing toward the launder. Inlet water pipes 75, 76, carrying water under pressure, are connected to the V-shaped pipe section 81 and are clamped in place by U-bolts 77, 78 extending through the flange 79 of the angle iron 80 forming an end supporting frame for the launder. The V-shape spray 73 ejects a spray of water in the form of a sheet or blanket over the surface of the metal side walls 55, 56 of the inclined launder 14. This provides additional water to carry the granulated product down the launder and also insures a protective water blanket to prevent burning out of the steel walls of the launder. A pipe 71, having a burner end 71a and pivoted at 72 on the framework, is connected to a source of combustible gas. Gas may be burned at the open end 71a and the flame directed into the ladle at its pouring spout to prevent undue cooling of the molten charge within the ladle and about its lip.

The water sprays are enclosed by steel-plate, box-like enclosure 84 closed at the upper front end and sides; the open lower front end communicating with the upper open end 85 of launder 14. The box-like enclosure confines the movement of both the water from the jets and sprays and the molten or comminuted charge within the apparatus and helps to direct the flow of water and comminuted product into and down the launder. It will be noted that the arrangement of the jets and sprays is such as to traject the molten magma transformed to small droplets or globules and to direct the quickly frozen solid granules and the water in a direction toward and down the launder.

The launder 14, as shown, comprises a launder section formed from a 4" steel pipe cut at 133° for a bottom 86, the sides 55 and 56 extending upwardly and outwardly from the tangent at the 133° points, at an angle of 5⅛" in 12" with the vertical. The pitch of the launder from end to end is 3 3/16" to 12" and this pitch coupled with the movement of the water is sufficient to carry the granulated product down the launder to the separator 15, while maintaining constant agitation and submergence for efficient and rapid cooling of the granulated Ferramag product. The launder length, as shown, is approximately forty feet from spray nozzles to separator and this provides ample length for adequate time to quench the globules of Ferramag and to prevent their coalescense. The significant thing is to provide the launder with an inclination such that the granules travel submerged in the cooling water a sufficient time to be cooled and the flow of water fast enough to provide a velocity head sufficient to transport the granules to the foot of the launder.

At the foot of the launder 14 is a bucket-wheel separator device 15 for separating the granules of Ferramag from the stream of water and for directing the product into a conveyor 16 which will convey the granulated product to a desirable place for subsequent use or for further treatment. In general the separator comprises a box 90, a bucket-wheel 91 mounted for rotation on its axis 92, the buckets 93 (each being slotted along its bottom and provided with a V notch at the center of its lip) to drain off water. Upon rotation of the wheel 91 by a prime mover 94 the material is caught in the buckets 93. As the buckets move upwardly out of the water, maintained at constant level in the box by an overflow baffle, the water drains off the product and the overflow water may be returned to a cooling tower, sump or reservoir to provide a source of water to pass again through the spray device 13. The granulated product is discharged by the buckets as they move in their orbit, into a chute 95 into screw conveyor 16 where residual adherent water is drained off. The granulated product is then transported to the elevator 97 which will transport the material to an elevated storage bin (not shown).

In the operation of the hydraulic quenching and granulating apparatus, a charge of molten Ferramag was placed in the pouring ladle 10 at a temperature of about 2400° F. The molten charge was poured from ladle 10 into pouring spoon 11 at a rate to provide a flow of molten Ferramag over the lip of the spoon to cause it to flow as a free falling sheet-like stream at a rate of about 1/3 to 2/3 ton per minute. This stream may vary in size from about 1/2" to 1 1/2" in thickness and 1 1/2 to 6" in length, depending on spoon lip port. Primary quenching water was admitted through the orifices of the main jet spray plate 40 at a rate of 1250 g.p.m. (gallons per minute). The discharge velocity of the water from the orifice plate was 24 ft. p.s. (feet per second). Secondary impact jets of water were produced by flowing water at the rate of 150 g.p.m. through secondary jet spray nozzles 59, 60, 61, which provided a layer of very high velocity water to accelerate the quenching of the Ferramag and to minimize "fall through" of fines that might be formed by explosions of some of the Ferramag granules, which may happen on infrequent occasions.

The primary purpose of the pair of flat line impact spray nozzles 62, 63, the two high velocity flat line spray nozzles 66, 67 and the V-type spray nozzle 73 at the launder bottom near its head end is to keep the walls of the launder covered with a blanket of water. Combined water through these nozzles was 110 g.p.m. This water through sprays 62, 63, 66, 67 and 73 by reason of its direction of flow and amount kept the sides and bottom of the launder 14 covered with a flowing cooling blanket and this water together with the water from the primary impact jets through the slot orifices 50—54 and the secondary impact jets through the flat impact spray nozzles 59, 60, 61, maintained a sufficient flow of water to prevent "burn out" of the launder and to prevent build up of fines and provided sufficient velocity head and flow to carry the granulated Ferramag down the launder. Also the water from the lower nozzles 66, 67 serves to wash away into the flowing stream of water down the launder any material that may fall vertically through the cross currents of water from the primary impact orifices 50—54 and the secondary impact orifices 59—61.

The length of time required for the Ferramag flow from the instant the molten stream left the lip 36 of the pouring spoon 11 to the time the resulting granulated product reached the foot end of the launder 14 averaged 1 1/3 seconds and the temperature was reduced from about 2400° F. for the molten charge to approximately 200° F. for the granulated product at the foot of the launder, showing an average rate of cooling of probably 1600–1700° per second; it being noted that the droplets of molten charge, which are first produced from the impact of the cross current of water against the molten stream of Ferramag, were solidified into separate granules almost instantaneously or at least in a very small fraction of a second.

The tremendously rapid chilling of the Ferramag as described above produced remarkable and previously unpredictable results. The dispersing spray of globules of molten Ferramag as formed from the molten falling stream, which simulate spherical or rain-drop shapes, are almost instantaneously frozen by the water. Within the first small fraction of the interval of 1 1/3 seconds which is the time of travel from spoon lip to the foot of the launder, the droplets of molten material are solidified so rapidly that they do not have time to shrink and come to equilibrium according to the laws of linear thermal contraction and molecular rearrangement. Hence, when the final granulated product attains atmospheric or room temperature, it appears to be under stress which manifests itself later when being preheated during the process of reduction to form sponge iron. At that time, as the temperature is being brought up to a dull red heat, there is an audible crackling or popping characteristic of decrepitation. Particles in the bed as it moves in the heating apparatus can be seen to twitch and at times some particles will be violently ejected from the bed. These annealing phenomena take place only during such preheating. We discovered by testing such preheated particles or granules by subsequent cooling and reheating in the laboratory, that nothing unusual happens on such subsequent reheating.

The structure of the hydraulically produced granules of Ferramag produced by us as observed in the microscope under high power magnification is seen to be similar to an exceedingly fine cluster or mosaic rather than of a uniform massive structure. Microscopic examination indicates a large portion of rounded, internally fractured, granules with a lesser amount of jagged particles. The mosaic structure of a granule appears to be composed of large numbers of exceedingly small, smooth, rounded subparticles. A column of rounded granules possessing this mosaic structure is considerably more permeable to gases than a comparatively tight aggregate which would form in a column of like material that has been cooled slowly to a dense non-porous product by conventional casting methods and then crushed to angular particles of various sizes. This permeable structure, characteristic of the water quenched, rapidly cooled granules produced according to our invention, is advantageous in the subsequent reduction treatment to which the iron oxide product is subsequently subjected to produce sponge iron. Also, the porosity is further augmented by production of pores in the granules caused by the removal of oxygen (one atom of oxygen from a molecule of free FeO, four atoms from $Fe_3O_4$ and three atoms from $Fe_2O_3$) when the oxide product is reduced to sponge iron. The advantages of the porous sponge iron in copper recovery methods are, of course, well known. This is particularly noticeable in the quick reaction noted when the sponge iron is reacted with copper-containing acid mine waters or leach dump waters. Hence, it will be seen that the porosity produced mechanically by water quenching and granulation according to our process is a substantial aid in the subsequent reducing process to form sponge iron from the Ferramag. Without such initial intentionally produced porosity in the Ferramag, the rate of reduction by a reducing agent would be materially lowered.

Also, it is important to control the size of the solidified particles which are intended to serve as "raw material" for production of sponge iron by reduction methods. Our process and apparatus for hydraulic quenching and granulation of the molten Ferramag are admirably suited for this purpose. We have found that (1) the size of the granules produced varies inversely as the impact imparted by the main jet sprays. This is a function of the water pressure and volume; and (2) that particle size varies directly as the pouring rate of molten charge or magma. These two critical relations may be combined by means of the so-called "Water-Solids Ratio" defined as the ratio of pounds of water to pounds of solid material per unit of time. The geometrical location and symmetry in space of the various sets of sprays with respect to the launder mouth and side walls are also significant.

The main spray volume and/or pressure is the most important factor in controlling the particle size. The water-solids ratio affects the movements of the solidifying material and the cooling rate of the granulated material. The ratio of pounds of water to pounds of Ferramag should preferably be maintained between 8.0 and 15.0. The geometric relationship in space of all sprays other than the main spray (orifice plate 40) is designed to direct granulated particles properly, prevent launder wall burnout, launder wall build-ups and inhibit launder bottom blocking. The arrangement is such that, as a practical matter in the operation of the apparatus, it is possible to control particle size by manually controlling only the rate of pouring once the jets and sprays are adjusted to suitable flows. The particle size may be controlled by controlling the flow of molten charge over the lip of the pouring spoon, which may be varied, for example, from a small trickle to ⅔ ton, or even more, of Ferramag per minute.

The optimum pouring rate of the apparatus, as shown, is between ⅓ and ⅔ ton per minute. If the pouring rate is too slow the spoon lip tends to freeze over and block further pouring. If the pouring rate is too fast, the combined water flows fail to function properly in granulating, cooling, transporting and preventing build-ups of solid material. On the other hand, if the volume of main spray water is too small, the falling molten material may break through the spray at times and accumulate on the bottom of the launder at or just down stream from the launder mouth and cause a "build-up." The rapid cooling of the outside portion of the lumps or "build-up" may leave a residual molten or mushy interior. Sometimes this may cause noisy explosions of greater or less violence which tend to throw solid material and water out of the open top of the launder, thus disrupting momentarily the uniform progress of normal operation. Hence, it is important to adjust the flow of water in relation to the pouring of the molten charge in a ratio to avoid these unwanted lumps or "build-ups."

The following Table I shows the particle size screen analysis of three runs of the apparatus under conditions as set forth above wherein the water to Ferramag ratio was maintained at about 14.0.

TABLE I

| Run | Tons of Ferramag | Screen analysis (mesh), percent | | | | |
|---|---|---|---|---|---|---|
| | | +¼" | −¼"+10 | −10+30 | −30+100 | −100 |
| A | 2.33 | 18.97 | 44.69 | 32.68 | 3.39 | 0.27 |
| B | 4.33 | 12.93 | 46.63 | 37.02 | 6.03 | 0.39 |
| C | 3.93 | 2.34 | 29.00 | 49.08 | 12.91 | 6.67 |

The particle sizes of the material of the above runs are quite satisfactory for reduction and in actual plant practice proved to be quite amenble to reduction and handling in the sponge iron producing plant. Other runs were made with materially greater volume of water forced through the main spray for comparable rate of pouring of the molten Ferramag. However, the granulated material produced contained very little if any particles over ¼" in size and this was not as suitable as a charge for gaseous reduction to sponge iron as that disclosed in Table I because with too large a proportion of finer sizes, gas passage becomes unmangaeable. With too much coarser sizes, reduction of the larger particles becomes inefficient, leaving unreduced cores therein.

The following Table II shows: (1) slowly-cooled Ferramag in which the molten Ferramag was cast, slowly cooled and then crushed to particle size in comparison with (2) granulated Ferramag produced in run C (Table I).

iron when compared with a slowly cooled, crushed raw material.

The following Table III shows a calculated mineralogical analysis of the slowly cooled material (designated S.C. in Table II) before and after reduction in the reducing plant to sponge iron and of the granulated material produced by our process (designated G in Table II), before and after reduction in the reducing plant to sponge iron.

TABLE III

| | Ferramag slowly-cooled | | Ferramag granulated | |
|---|---|---|---|---|
| | Before reduction, percent | After reduction, percent | Before reduction, percent | After reduction, percent |
| $Fe_m$ | | 71.53 | | 81.22 |
| $Fe_2O_3$[1] | 3.79 | | 8.09 | |
| $Fe_3O_4$ | 57.33 | | 45.79 | |
| $FeO$ | 15.51 | | 30.42 | |
| $Cu_2S$ | 3.66 | 1.26 | 4.12 | 0.65 |
| $Cu$ | 3.22 | 6.81 | 1.11 | 5.20 |
| $Zn$ | | 0.31 | | 0.13 |
| $Ni$ | | 0.18 | | 0.18 |
| $Ni_2SiO_4$ | 0.25 | | 0.25 | |
| $Zn_2SiO_4$ | 0.90 | | 0.82 | |
| Free $SiO_2$ | | 0.39 | 2.05 | 3.04 |
| $Fe_2SiO_4$ | 12.18 | 15.51 | 4.96 | 6.46 |
| Difference | 3.16 | 4.01 | 2.39 | 3.12 |
| Total | 100.00 | 100.00 | 100.00 | 100.00 |

[1] Probable presence of Hematite $Fe_2O_3$ has been suggested jointly by laboratory evidence and by the necessary requirement for stoichiometrically balancing of net Fe and net O.

It will be seen from the foregoing that the product of our process and apparatus has material advantages over comminuted material produced by conventional methods. Our process is economical, it produces an iron oxide "raw material" which has greater amenability to reduction to sponge iron, and a greater proportion of the total iron content is rendered available for reduction. According to our process the molten material may be converted into properly sized, granulated, cooled solidified product with minimum processing time, equipment and storage requirements and with minimum labor and maintenance costs. Furthermore solidification of the molten material as rapidly as possible after initial subdivision inhibits insofar as operating conditions permit, associaton of free molecules or radicals into undesirable complex compounds.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for hydraulically quenching and granulating a charge of molten Ferramag to solid particles of

TABLE II

*Laboratory Analysis*

| | $H_2$ loss in lab., percent | $Fe_T$, percent | $Fe_m$, percent | $Fe_3O_4$, percent | $Cu$, percent | $SiO_2$, percent | $S$, percent | $Zn$, percent | $Ni$[2], percent | Percent of $Fe_T$ reduced |
|---|---|---|---|---|---|---|---|---|---|---|
| S.C.—Slowly cooled massive | 21.44 | 62.87 | [1] 0.00 | 57.33 | 6.14 | 4.42 | 0.74 | 0.53 | 0.14 | |
| G—Quenched and granulated | 23.14 | 65.35 | [1] 0.00 | 45.79 | 4.40 | 4.64 | 0.83 | 0.48 | 0.14 | |
| S.C.a—Completely reduced sponge iron from massive | | 80.03 | 71.53 | | | | 0.25 | 0.31 | | 89.4 |
| Ga—Completely reduced sponge iron from granulated | | 84.75 | 81.22 | | | | 0.13 | 0.13 | | 95.8 |

[1] Metallic iron from pulverizer calculated out.
[2] Ni value assumed from previous studies of Ferramags.

The foregoing Table II not only shows a typical laboratory analysis of Ferramag but also a materially higher percentage of total iron reduced to sponge iron when the water quenched, granulated Ferramag produced by our method is used as raw material for reduction to sponge small sizes which comprises a framework, a tiltable holding ladle for a charge of said molten Ferramag, means mounting said ladle on said framework for tilting the ladle, means including an adjustable pouring spoon for pouring at controlled rate a free falling stream of said molten charge primary and secondary water jet orifice devices mounted on said framework and positioned to direct water across the path of travel of said stream of free falling molten charge, means to force water through said primary and secondary jet devices with sufficient force to cause said water to contact said stream of molten charge with sufficient impact force to break up said molten stream of charge into separate small globules, other water spray devices through which water is forced, means to supply sufficient water through said jets and sprays to quickly quench and freeze said molten globules to solid-state granular form, an inclined launder having a head end and a foot end, the head end being positioned to receive the water from said devices together with the globules of charge thus formed, the inclination of said launder being sufficient to cause water to flow therein in volume and velocity sufficent to quench the solidifying globules to solid-state form and transport them in said launder to its foot while cooling the granules to below 200° F., a separator device to receieve the cooled granules at the foot of said launder and remove them from said flowing water.

2. Apparatus for hydraulically quenching and granulating a charge of molten Ferramag to form small solid particles of sizes suitable for producing sponge iron by a reduction process which apparatus comprises a framework, means including a holding ladle for a charge of said molten magma, means including an adjustable pouring spoon having a lip for pouring at controlled rate a free falling stream of said molten charge, a water box connected to a source of water under pressure, an orifice plate having a plurality of elongated horizontally disposed and a pair of angularly disposed jet orifices mounted on the face of said water box to provide primary water jets, a plurality of secondary flat orifice jet sprays mounted beneath said box, said secondary sprays being connected to a source of water under pressure, said primary and secondary jets being mounted in a position to eject water across the path of travel of a stream of molten charge poured over the lip of said spoon, means to force water through said primary and secondary jet orifices with sufficient impact against a falling stream of molten charge poured over said lip to subdivide said molten charge into molten globules in which a majority is within the sizes of −¼" and +30 mesh, other water spray devices arranged outside the area of said jet orifices for spraying a blanket of cooling water to aid in cooling the hereinafter mentioned launder, an inclined launder having a head end and a foot end, the head end being positioned to receive the water from said jets and sprays together with the sprayed globules of charge thus formed, the said water serving to quench and cool the molten globules to solid-state granules and to transport the granules to the foot of said launder while cooling the resulting granules and means to receive the cooled granules at the foot of said launder.

3. The method of hydraulically quenching and granulating a charge of molten Ferramag containing a predominant amount of oxides of iron to form solidified granules of small particle sizes suitable for producing sponge iron by a reduction process, which comprises pouring said molten Ferramag at a controlled rate to form a free falling sheet-like stream of charge, simultaneously subjecting said free falling molten stream of Ferramag to continuously flowing primary and secondary streams of water directed in different planes in flat patterns in a direction across the path of travel of said free falling stream while causing said water to contact said molten stream with sufficient force to cause said molten charge to be subdivided into separate small molten globules and sufficient in amount to quickly cool and freeze said globules to solid-state granular form in which a majority of said granules are of a size between ¼" and 30 mesh, further cooling said solidified granules by transporting said solidified granules in a confined stream of said water produced by said primary and secondary streams to a receiver and separating the water from the solid-state cooled granules.

4. The method of hydraulically quenching and granulating a charge of molten magma such as Ferramag which contains a predominant amount of oxides of iron to form solidified granules of small particle sizes which comprises pouring said molten magma at a controlled rate to form a free falling sheet-like stream of charge of a thickness between ½" and 1½" and length between 1½ and 6", simultaneously subjecting said free falling molten stream to continuously flowing horizontally and angularly disposed flat jets of water directed in a direction across the path of travel of said free falling stream to contact said molten stream with sufficient force to cause said molten charge to be subdivided into separate small molten globules of a size in which at least 70% is between ¼" and 30 mesh and at least 10% is +¼" and sufficient in amount to quickly freeze the molten globules to solid-state internally-fractured granules, directing said water and the granulating particles thus formed into a receiving, quenching and transporting launder, and flowing said water and quenched particles in a confined stream through said launder to a receiver thereby further cooling the granules so produced thereby producing a granulated product containing at least 70% of the particles having a size between ¼" and 30 mesh and at least 10% of the particles having a size +¼".

5. The method of hydraulically quenching and granulating a charge of molten Ferramag to form solidified granules of small particle sizes suitable for reduction to sponge iron by a reduction process which comprises providing a charge of molten Ferramag at a temperature of about 2400° F., pouring said molten Ferramag at a controlled rate to form a free falling sheet-like stream of Ferramag, simultaneously subjecting said free falling molten stream to a plurality of continuously flowing primary jets of water directed in flat patterns in separate planes and in a direction across the path of travel of said free falling stream to contact said molten stream and simultaneously flowing secondary jets of water across said path in a plane below the planes of the patterns of said primary jets of water and imparting to said primary and secondary jets of water sufficient force to cause said molten Ferramag to be subdivided into separate small molten particles and simultaneously flowing water in spray patterns surrounding said primary and secondary jets, the water in said jets and sprays being sufficient in amount to cool and quickly freeze said molten particles to solid-state form in which at least 70% of the particles are of a size between ¼" and 30 mesh, and then causing said water further to cool said solidified particles to a temperature less than 200° F. by transporting said solidified particles confined in a stream of said water to a receiver.

6. A method according to claim 5 in which the subdivided molten particles are substantially instantaneously frozen to solid-state internally fractured granules thereby preventing shrinkage that would otherwise occur on slow cooling of said molten Ferramag to solid state massive castings.

7. A method according to claim 6 in which the time elapsed from the subdivision of the free falling molten stream of Ferramag into molten particles and cooling the solidified granules to 200° F. is less than two seconds.

8. A method according to claim 7 in which the rate of production of granules is about ten tons in a fifteen to thirty minute period.

9. Apparatus for hydraulically quenching and granulating molten magma, such as Ferramag, to small particle sizes which comprises a framework; means including a holding receptacle for a charge of said molten magma; means for pouring at controlled rate a free falling flat stream of said molten charge; water jet devices comprising a water box; an orifice plate on one side of said water box; and means in said plate defining a plurality of substantially horizontally disposed elongate orifice slots and an angularly disposed elongate orifice slot beyond the ends of said horizontally disposed slots; said water box being mounted on said framework with said plate positioned to direct water through said horizontal slots across the path of travel of said stream of free falling molten charge and to direct water through said angularly disposed slots; a set of water spray nozzles positioned outside the area of said orifice plate; means to force water through said slots with sufficient force to cause said water to contact said stream of molten charge with sufficient impact force to break up said molten stream of charge into separate small molten particles; and means to force water in sufficient quantity through said slots and nozzles to quench and solidify rapidly the particles to granular form without coalescence; adjustable control means to change the amount and force of said water through said slots for controlling the resulting sizes of said particles; an inclined launder, trough-shaped in cross section and having a head end and a foot end and side walls, the head end of said launder being positioned adjacent said orifice plate and nozzles to receive the water from said slots and nozzles together with the granulated particles of charge thus formed; the water from said devices forming a blanket to protect the launder from the heat in said magma and serving to transport the solidified granules to the foot of said launder while cooling said granules and means to receive the cooled granules at the foot of said launder.

10. Apparatus for hydraulically quenching and granulating molten magma and the like to small particle sizes which comprises a framework; means including a holding receptacle for a charge of said molten magma; means for pouring at controlled rate a free falling flat stream of said molten charge; water jet devices comprising a water box through which water is passed under high pressure, an orifice plate on one side of said water box, and means in said plate defining a plurality of substantially horizontally disposed orifice slots and an angularly disposed elongate orifice slot beyond the ends of said horizontally disposed slots, said water box being mounted on said framework with said plate positioned in a plane at substantially right angles to the long axis of the hereinafter mentioned launder to direct water through said horizontal slots across the path of travel of said stream of free falling molten charge and to direct water through said angularly disposed slots; a set of water spray nozzles positioned outside the area of said orifice plate; means to force water through said slots with sufficient force to cause said water to contact said stream of molten charge with sufficient impact force to break up said molten stream of charge into separate small molten particles; and means to force water in sufficient quantity through said slots and nozzles to quench and solidify rapidly the particles to granular form without coalescence; adjustable control means to change the amount and force of water through said slots for controlling the resulting sizes of said particles; an inclined launder, trough-shaped in cross section and positioned with its long axis at substantially right angles to the plane of said orifice plate, said launder having a head end and a foot end and side walls, the head end being positioned adjacent said orifice plate and nozzles to receive the water from said slots and nozzles together with the granulating particles of charge thus formed, the said water forming a blanket to protect the launder from the heat in said magma and serving to transport the solidified granules to the foot of said launder while cooling said granules and means to receive the cooled granules at the foot of said launder.

11. Apparatus for hydraulically quenching and granulating a molten charge of Ferramag to small particle sizes suitable for subsequent treatment in a gaseous reduction process to sponge iron which comprises a framework, a tiltable holding ladle for a charge of said molten magma, a pouring spoon adjustably mounted on said framework for pouring at controlled rate a free falling flat stream of said molten charge, power means connected to said ladle for tilting said ladle to pour charge into said spoon, a water box mounted on said framework, an orifice plate secured to said water box, a plurality of horizontally disposed elongate orifice slots in said plate and a plurality of angularly disposed elongate orifice slots in said plate beyond the ends of said horizontally disposed slots, said plate being positioned to direct water through said horizontally disposed slots across the path of travel of said stream of free falling molten charge, a plurality of water spray nozzles positioned outside the area bound by said orifice slots and positioned to direct water in the same general direction as said orifice slots, means to force water through said slot and nozzle devices with sufficient force to cause said water to contact said stream of molten charge with sufficient impact force to subdivide said molten stream of charge into separate small molten globules and to rapidly solidify the molten globules to granular form, adjustable control means to change the amount and force of the water through said slots for controlling the resulting sizes of said particles, an inclined launder having a head end and a foot end, the head end being positioned to receive the water from said slot and nozzle devices together with the granules of charge thus formed, the inclination of said launder being such that the flowing water from said slots and nozzles transports said solidified granules to the foot of said launder while cooling said granules, a separator device to receive the cooled granules at the foot of said launder to separate said cooled granules from said flowing water.

References Cited in the file of this patent

UNITED STATES PATENTS

| | | |
|---|---|---|
| 1,117,644 | Donaldson | Nov. 17, 1914 |
| 2,210,999 | Bartholomew | Aug. 13, 1940 |
| 2,212,962 | Stuart et al. | Aug. 27, 1940 |